May 16, 1950 H. KASPEROWICZ 2,508,267

COLOR TELEVISION

Filed Oct. 26, 1945

Henry Kasperowicz
INVENTOR

BY Charles W. Mortimer

Patented May 16, 1950 2,508,267

UNITED STATES PATENT OFFICE 2,508,267

COLOR TELEVISION

Henry Kasperowicz, Passaic, N. J., assignor to Allen B. Du Mont Laboratories, Inc., Passaic, N. J., a corporation of Delaware Application October 26, 1945, Serial No. 624,846

13 Claims. (Cl. 178—5.2)

This invention relates to color television. It relates more particularly to screens or mosaics for cathode-ray tubes, used in television transmitting and receiving, that are adapted to generate and receive signals in accordance with colors of the objects or scenes that are televised.

With this invention the blue, green and red components of a scene are caused to produce signals which when received as described below will reproduce the original scene or object in accordance with the colors thereof in their original relative positions and intensities.

In carrying out the invention the photoelectric screen of an iconoscope or television transmitting tube is prepared in such a way that when a scene is focussed thereupon and scanned in the usual way with an electron beam, signals are produced, which when received by a kinescope or television receiver having a fluorescent screen of the sort described below will be reproduced in the original colors.

The invention may be understood from the description in connection with the accompanying drawings in which.

Figures 1, 2:
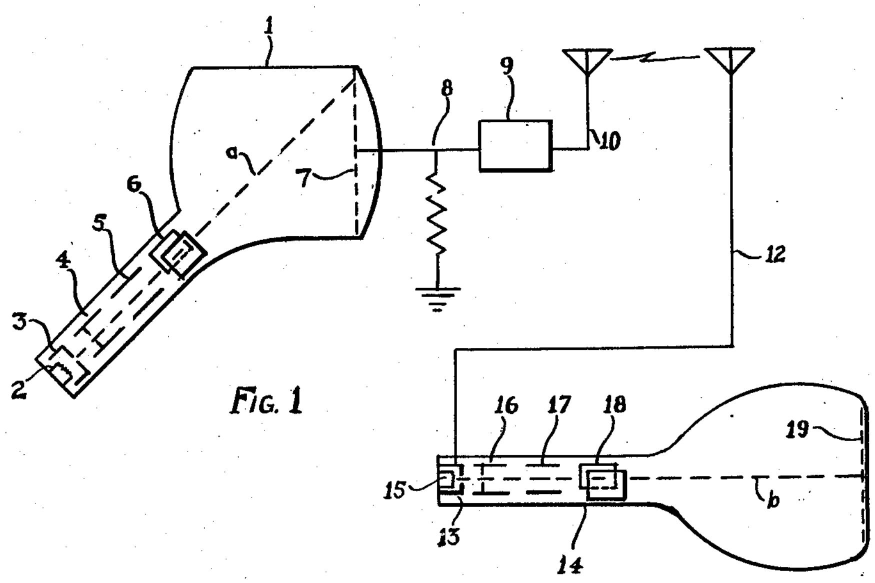
Fig. 1 is a somewhat diagrammatic side view of the television transmitter.
Fig. 2 is a somewhat diagrammatic view of the television receiver.

In the drawing reference character 1 indicates a television transmitter or iconoscope tube for transmitting a view or signal from the scene to be televised.

This transmitter comprises a cathode 2, control grid 3, anode 4, horizontal and vertical pairs of deflection plates 5 and 6, and a screen 7 of photoelectric material.

An output lead 8 is connected to the screen 7 and an amplifier 9 is indicated for amplifying the output. Means, not shown, are provided in the usual way for introducing blanking and synchronizing signals into the video channel from the tube 1. The antenna 10 is indicated diagrammatically, and the beam *a* for scanning the screen 7 is shown in dotted lines.

The receiving antenna 12 is connected to the control grid 13 of the kinescope or receiving tube 14. The cathode of this tube is indicated at 15, the anode is indicated at 16, and the horizontal and vertical pairs of deflection plates 17 and 18 are provided in the usual way. The cathode-ray beam *b* is caused to scan the screen 19 of fluorescent material in accordance with signals received from the transmitter, so that beams *a* and *b* are kept in synchronism.

Figure 3:
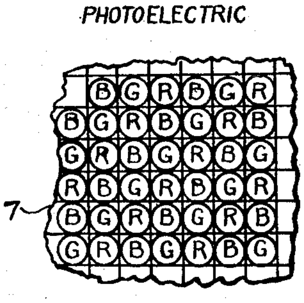
Fig. 3 is a front view partly broken away of a screen for the television transmitter.

A section of the mosaic screen 7 is shown on an enlarged scale in Fig. 3 as a tricolor response screen. It is composed of small areas of three sorts of photo-electric materials which become charged electrically when light from a scene to be televised is focussed upon them, one third of the areas being charged when blue light strikes them, another third when green light strikes them, and the others when red light strikes them.

Figure 4:
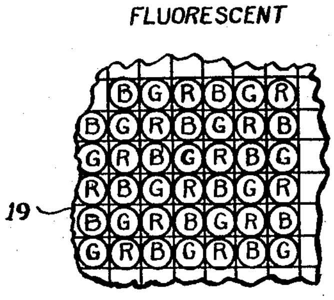
Fig. 4 is a corresponding view of the screen for the television receiver.

A corresponding section of the screen 19 at the receiver is shown on an enlarged scale in Fig. 4. It is composed of three sorts of fluorescent material that yield blue, green and red light respectively when scanned by the electron beam of the tube 14. The amount of light varies in intensity in accordance with the strength of the beam *b* as controlled by the signals received by the antenna 12 and applied to control grid 13.

The photoelectric materials are so located on the plate 7 of transmitting tube 1 that an element of photoelectric material that is sensitive to green light lies between elements of photoelectric materials that are sensitive to blue and red light, respectively, both horizontally and vertically as shown in Fig. 3.

The fluorescent materials or phosphors that are coated upon the screen 19 of the receiving tube 14 are arranged in the same way with respect to each other.

With this arrangement, when an object having blue portions is focussed upon the screen 7 the scanning of this beam by the ray *a* will cause impulses to be transmitted by antenna 10 from the blue areas of the screen upon which blue portions of the object are focussed, and since the beam *b* is synchronized with the beam *a* it is turned on when it is contacting with the blue areas of the screen *b* and in proportion to the intensity of blue color in these blue areas of screen 7. The same obtains with respect to the other color areas so that the charges on the screen 7 corresponding to colors in the view or object being televised are reproduced in corresponding colors on corresponding portions of the screen 19 when the transmitter 1 is operating and the receiver 14 is tuned thereto.

The means for making certain elements sensitive to only certain types of light might be for instance, a color pattern of the type shown in Figure 3 composed of conventional gelatine filter elements sealed between thin glass sheets and placed over the mosaic prior to evacuation.

Alternative means might be the focussing of the scene to be televised upon a gelatine color pattern and refocussing the image of this upon the mosaic.

While preferred embodiments have been illustrated and described, it is apparent to those skilled in the art that modifications are possible without departing from the scope of the invention. For instance, the areas of different light characteristics need not be arranged specifically in a straight vertical line, but adjacent areas may be offset slightly if desired, retaining however the general pattern in which adjacent areas are of different light color characteristics.

What is claimed is:

1. A cathode ray tube for color television, said tube having a screen comprising sequential individual areas of light translating material, each said area having a light color characteristic different from the horizontal and vertical adjacent areas.

2. A cathode ray tube for color television, said tube having a screen comprising successive individual areas of light translating material, said areas being arranged in rows, each said area being horizontally and vertically adjacent an area having different light color characteristics.

3. A cathode ray tube for color television, said tube having a screen comprising sequential individual areas of fluorescent material, each said area having a light color characteristic different from the horizontally and vertically adjacent areas.

4. A cathode-ray tube screen suitable for color television which comprises successive individual areas of fluorescent materials that yield red, blue and green light respectively when struck by a cathode-ray beam, each said area being horizontally and vertically adjacent areas of different light color characteristics.

5. A cathode-ray tube screen suitable for color television which comprises successive individual areas of fluorescent materials in horizontal and vertical rows that yield red, blue and green light respectively when struck by a cathode-ray beam, each said area being horizontally and vertically adjacent areas of different light color characteristics.

6. A cathode-ray screen comprising horizontal and vertical rows of areas of fluorescent material which yield red, blue and green light respectively when scanned by an electron beam, each area being of a color different from that of any adjacent area in the same horizontal and vertical rows.

7. A cathode-ray tube suitable for color television, said tube having a screen of fluorescent material on the inside of the large end thereof, said screen comprising rows of screen material each row being made up of segregated areas of screen material, each area having its edges in contact with edges of other areas that fluoresce in colors that are different from that in which it fluoresces when said areas are scanned by a cathode ray beam.

8. A cathode ray tube for color television, said tube having a screen comprising sequential individual areas of photoelectric material, each said area having a light color characteristic different from the horizontally and vertically adjacent areas.

9. A cathode-ray tube screen suitable for color television which comprises successive individual areas of photoelectric material having color responses only to light wave lengths corresponding to red, blue and green respectively when struck by a cathode-ray beam, each said area being horizontally and vertically adjacent areas of different light color characteristics.

10. A cathode-ray tube screen suitable for color television which comprises successive individual areas of photoelectric material in horizontal and vertical rows having color responses only to light wave lengths corresponding to red, blue and green respectively when struck by a cathode-ray beam, each said area being horizontally and vertically adjacent areas of different light color characteristics.

11. A television system comprising a television transmitter and a television receiver, said transmitter including a cathode ray tube having a screen of photoelectric material and said receiver including a cathode ray tube having a screen of fluorescent material, each said tube comprising sequential individual areas of light translating material, each said area having a light color characteristic different from the horizontally and vertically adjacent areas.

12. The system of claim 11 in which different portions of fluorescent material produce respectively red, blue and green light when scanned by an electron beam.

13. The system of claim 11 in which different portions of said photoelectric material respond respectively to red, blue and green light and corresponding portions of said fluorescent material yield correspondingly colored lights.

HENRY KASPEROWICZ.

REFERENCES CITED

The following references are of record in the file of this patent:

UNITED STATES PATENTS

| Number | Name | Date |
|---|---|---|
| 1,691,324 | Zworykin | Nov. 13, 1928 |
| 1,934,821 | Rudenberg | Nov. 14, 1933 |
| 1,988,605 | Michelssen | Jan. 22, 1935 |
| 2,294,820 | Wilson | Sept. 1, 1942 |
| 2,301,521 | Cawein | Nov. 10, 1942 |
| 2,310,863 | Leverenz | Feb. 9, 1943 |
| 2,389,979 | Huffnagle | Nov. 27, 1945 |

FOREIGN PATENTS

| Number | Country | Date |
|---|---|---|
| 434,868 | Great Britain | Sept. 6, 1935 |

Disclaimer 2,508,267.—*Henry Kasperowicz*, Passaic, N. J. COLOR TELEVISION. Patent dated May 16, 1950. Disclaimer filed Sept. 28, 1951, by the assignee, *Allen D. Du Mont Laboratories, Inc.*, the inventor assenting and agreeing.

Hereby enters this disclaimer to the effect that claims 1, 2, 3, 7, 8, and 11 are limited to the primary colors, namely, red, blue and green, as distinguished from black or white of said patent.

[*Official Gazette November 6, 1951.*]